(12) United States Patent
Ishikawa

(10) Patent No.: US 11,912,117 B2
(45) Date of Patent: Feb. 27, 2024

(54) VEHICLE

(71) Applicant: Toyota Jidosha Kabushiki Kaisha, Toyota (JP)

(72) Inventor: Yujiro Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 410 days.

(21) Appl. No.: 17/205,214

(22) Filed: Mar. 18, 2021

(65) Prior Publication Data
US 2021/0331569 A1 Oct. 28, 2021

(30) Foreign Application Priority Data
Apr. 28, 2020 (JP) ................................ 2020-079397

(51) Int. Cl.
*B60K 1/00* (2006.01)
*B60W 20/10* (2016.01)
*B62D 25/08* (2006.01)

(52) U.S. Cl.
CPC ............... *B60K 1/00* (2013.01); *B60W 20/10* (2013.01); *B62D 25/085* (2013.01)

(58) Field of Classification Search
CPC ...... B60K 1/00; B60K 1/04; B60K 2001/001; B60K 2001/0438; B60K 2001/0411; B60K 6/26; B60K 6/40; B60W 20/10; B62D 25/085; B62D 25/082; B62D 25/145; B62D 21/02
See application file for complete search history.

(56) References Cited

U.S. PATENT DOCUMENTS

| | | | |
|---|---|---|---|
| 2012/0097466 A1* | 4/2012 | Usami ..................... | B60K 1/04 180/68.5 |
| 2013/0248275 A1* | 9/2013 | Cunningham .......... | B60K 1/00 180/291 |
| 2019/0126989 A1 | 5/2019 | Okura | |
| 2019/0337374 A1* | 11/2019 | Yokoyama ............... | B60K 1/00 |

FOREIGN PATENT DOCUMENTS

| | | | |
|---|---|---|---|
| EP | 1674316 A1 | | 6/2006 |
| EP | 3524496 A1 | | 8/2019 |
| EP | 3483040 B1 | | 11/2020 |
| JP | H08192639 A | * | 7/1996 |
| JP | 2011020602 A | | 2/2011 |
| JP | 2015-089750 A | | 5/2015 |
| JP | 2019-085087 A | | 6/2019 |
| JP | 2019-085088 A | | 6/2019 |
| JP | 2019-137200 A | | 8/2019 |
| JP | 2020032954 A | | 3/2020 |

\* cited by examiner

*Primary Examiner* — George C Jin
(74) *Attorney, Agent, or Firm* — Dinsmore & Shohl LLP

(57) ABSTRACT

A vehicle includes a vehicle body in which a mounting chamber is provided, and an equipment unit disposed within the mounting chamber. The equipment unit includes a compartment cross member extending in one direction, the compartment cross member of which a first end portion and a second end portion situated on respective ends in the first direction being fixed to the vehicle body, and a first equipment and a second equipment fixed to the compartment cross member and disposed with a spacing between each other. A rigidity of the equipment unit at a portion situated between the first equipment and the second equipment is higher than a rigidity of the equipment unit at a portion where the first end portion is situated.

8 Claims, 13 Drawing Sheets

RELATED ARTS

RELATED ARTS

RELATED ARTS

VEHICLE

CROSS-REFERENCE TO RELATED APPLICATION

This application claims priority to Japanese Patent Application No. 2020-079397 filed on Apr. 28, 2020, incorporated herein by reference in its entirety.

BACKGROUND

1. Technical Field

The disclosure relates to a vehicle.

2. Description of Related Art

As more vehicles have come to be powered by electricity in recent years, various types of equipment are installed in vehicles. A vehicle described in Japanese Unexamined Patent Application Publication No. 2019-137200 (JP 2019-137200 A) is provided with a compartment cross member, a charger, and a power control unit.

Both ends of the compartment cross member are fixed to front side members and suspension towers of the vehicle. The charger and the power control unit are fixed to the upper face of the compartment cross member, with a spacing provided between the charger and the power control unit.

SUMMARY

In the above-described vehicle, the compartment cross member, the charger, and the power control unit are fixed to each other, making up one equipment unit. Both ends of this equipment unit are fixed.

The rigidity of the portion of the equipment unit at which the charger and the power control unit are disposed is high. On the other hand, the rigidity at both end portions of the equipment unit, and the rigidity of the portion situated between the charger and the power control unit is low.

When the vehicle travels, the equipment unit vibrates. At this time, both ends of the equipment unit are fixed, and accordingly portions with low rigidity vibrate more readily. Specifically, large vibrations are readily generated at the portion situated between the charger and the power control unit.

The present disclosure provides a vehicle in which occurrence of large vibrations can be suppressed in an equipment unit that includes a plurality of housings and a compartment cross member.

A vehicle according to an aspect of the present disclosure includes a vehicle body in which a mounting chamber is provided, and an equipment unit disposed within the mounting chamber. The equipment unit includes a compartment cross member extending in one direction, the compartment cross member of which a first end portion and a second end portion situated on respective ends in the one direction being fixed to the vehicle body, and a first equipment and a second equipment fixed to the compartment cross member, and disposed with a spacing between each other. The rigidity of the equipment unit at a portion situated between the first equipment and the second equipment is higher than the rigidity of the equipment unit at a portion where the first end portion is situated.

According to the above aspect, rigidity can be suppressed from being low between the first equipment and the second equipment, and the equipment unit can be suppressed from largely vibrating.

In the above aspect, the vehicle may further include a first attachment member configured to fix the first equipment to the compartment cross member, and a second attachment member configured to fixing the second equipment to the compartment cross member. The one direction may be a vehicle width direction. At least part of the first attachment member and at least part of the second attachment member may overlap as viewed in a vehicle front-back direction, between the first equipment and the second equipment in the vehicle width direction.

According to the above configuration, rigidity can be suppressed from being low between the first equipment and the second equipment.

In the above aspect, the vehicle may further include linking members that link the first equipment and the second equipment. According to the above configuration, rigidity can be suppressed from being low between the first equipment and the second equipment by the linking members disposed between the first equipment and the second equipment.

In the above aspect, the rigidity of the equipment unit at the portion situated between the first equipment and the second equipment may be higher than the rigidity of the equipment unit at a portion where the second end portion is situated.

In the above aspect, a third equipment fixed to the compartment cross member may be disposed between the first equipment and the second equipment. The rigidity of the equipment unit at a portion situated between the first equipment and the third equipment may be higher than the rigidity of the equipment unit at the portion where the first end portion is situated. The rigidity of the equipment unit at a portion situated between the second equipment and the third equipment may be higher than the rigidity of the equipment unit at the portion where the first end portion is situated.

In the above aspect, the vehicle may further include a first attachment member configured to fix the first equipment to the compartment cross member, a second attachment member configured to fix the second equipment to the compartment cross member, and a third attachment member configured to fix the third equipment to the compartment cross member. The one direction may be a vehicle width direction. At least part of the first attachment member and at least part of the third attachment member may overlap as viewed in a vehicle front-back direction, between the first equipment and the third equipment in the vehicle width direction. At least part of the second attachment member and at least part of the third attachment member may overlap as viewed in the vehicle front-back direction, between the second equipment and the third equipment in the vehicle width direction.

In the above aspect, the vehicle may further include a linking member that links the first equipment and the third equipment, and a linking member that links the second equipment and the third equipment.

In the above aspect, the rigidity of the equipment unit at the portion situated between the first equipment and the third equipment may be higher than the rigidity of the equipment unit at a portion where the second end portion is situated. The rigidity of the equipment unit at the portion situated between the second equipment and the third equipment is higher than the rigidity of the equipment unit at the portion where the second end portion is situated.

According to the above aspect of the present disclosure, occurrence of large vibrations can be suppressed in an equipment unit that includes a plurality of housings and a compartment cross member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle according to embodiments will be described with reference to FIGS. 1 through 18. Configurations in FIGS. 1 through 18 that are the same or substantially the same are denoted by the same signs, and repetitive description will be omitted.

First Embodiment

Figure 1:
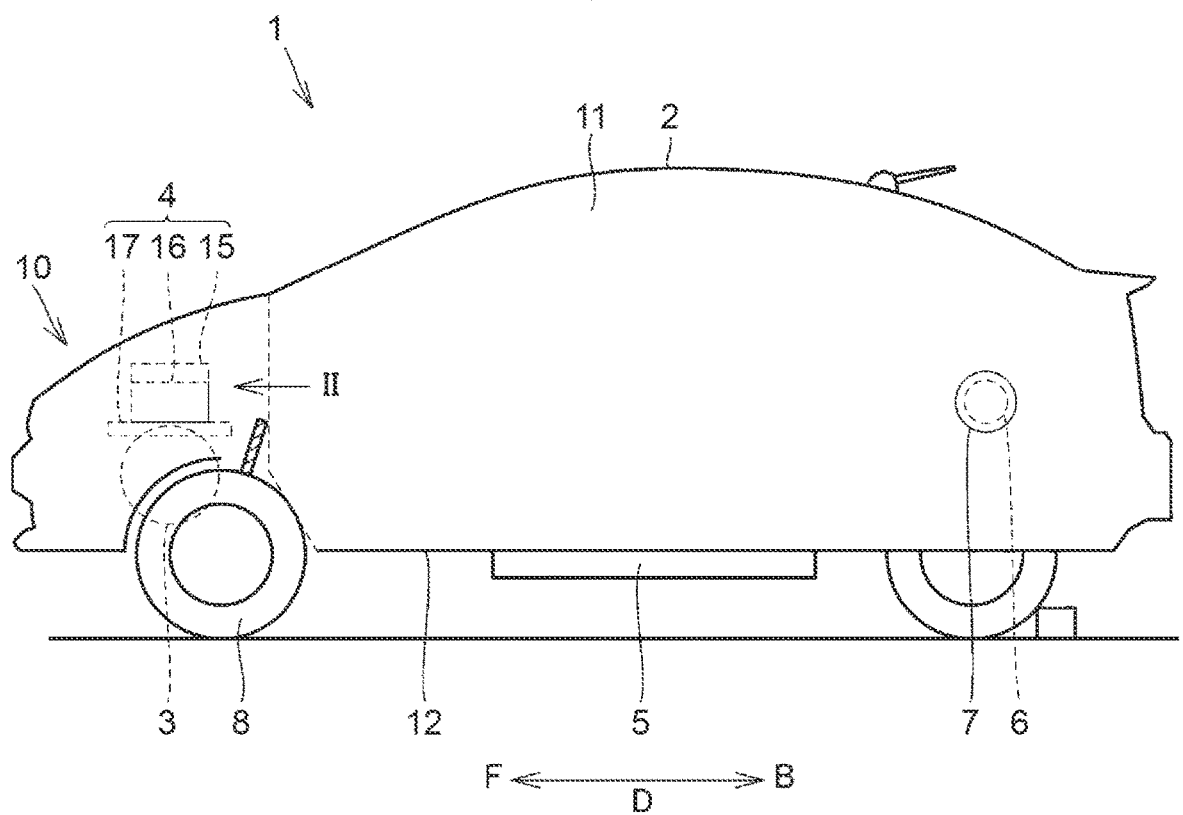
FIG. 1 is a side view schematically illustrating a vehicle according to a first embodiment.

FIG. 1 is a side view schematically illustrating a vehicle 1 according to a first embodiment. The vehicle 1 is provided with a vehicle body 2, a rotating electrical machine 3, an equipment unit 4, a battery 5, a connection portion 6, a charging port cover 7, and drive wheels 8.

A mounting chamber 10 and an occupant cabin 11 are provided within the vehicle body 2. The occupant cabin 11 is a space where occupants such as the driver ride. The mounting chamber 10 is provided at a vehicle forward F side from the occupant cabin 11. The rotating electrical machine 3 and the equipment unit 4 are disposed within the mounting chamber 10.

The vehicle body 2 includes a floor panel 12. The floor panel 12 is a member that defines the bottom face of the vehicle 1, and is a plate-like metal member.

The rotating electrical machine 3 is disposed inside the mounting chamber 10. Note that in the example illustrated in FIG. 1 here, the rotating electrical machine 3 is disposed below the equipment unit 4.

The equipment unit 4 includes a power control unit (PCU) 15, a charger 16, and a compartment cross member 17. Note that details of the equipment unit 4 will be described later.

The battery 5 is provided on the lower face of the floor panel 12. The battery 5 is, for example, a secondary battery such as a lithium-ion battery, or the like. The battery 5 is electrically connected to the PCU 15. The PCU 15 is electrically connected to the rotating electrical machine 3.

The PCU 15 boosts direct current electric power supplied from the battery 5, which is then further converted into alternating current electric power and supplied to the rotating electrical machine 3. The rotating electrical machine 3 rotates the drive wheels 8 by the alternating current electric power supplied from the PCU 15.

The charging port cover 7 is provided on a side face of the vehicle body 2 so as to be capable of opening and closing. Opening the charging port cover 7 externally exposes the connection portion 6. The connection portion 6 is configured so as to be connectable to a charging plug provided externally from the vehicle 1.

The connection portion 6 is electrically connected to the charger 16, and the charger 16 is electrically connected to the battery 5. When the charging plug is connected to the connection portion 6, alternating current electric power is supplied to the charger 16 via the connection portion 6. The charger 16 converts the alternating current electric power supplied thereto into direct current electric power, which is then supplied to the battery 5. Thus, the vehicle 1 according to the first embodiment is an electric vehicle.

Figure 2:
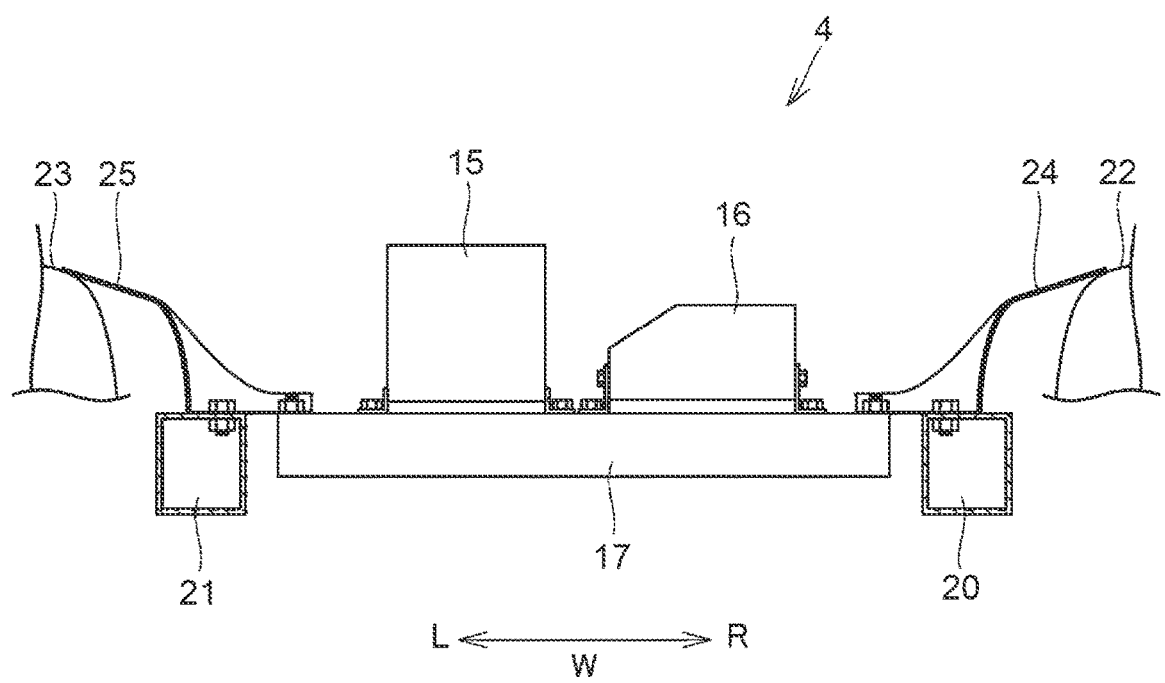
FIG. 2 is a diagram illustrating an equipment unit as viewed from a direction indicated by arrow II in FIG. 1.

FIG. 2 is a diagram illustrating the equipment unit 4 as viewed from a direction indicated by arrow II in FIG. 1. The vehicle body 2 includes side members 20 and 21 and suspension towers 22 and 23.

The side members 20 and 21 are disposed with a spacing therebetween in a vehicle width direction W, and the side members 20 and 21 are provided extending in the front-back direction of the vehicle 1.

Attachment members 24 and 25 are provided to the equipment unit 4, and the equipment unit 4 is fixed to the side members 20 and 21 and the suspension towers 22 and 23 by the attachment members 24 and 25. The attachment member 24 is provided to one end portion (a first end portion) of the compartment cross member 17 in the vehicle width direction W, the attachment member 25 is provided to the other end portion (a second end portion), and the one end portion and the other end portion of the compartment cross member 17 are thus fixed to the vehicle body 2.

Figure 3:
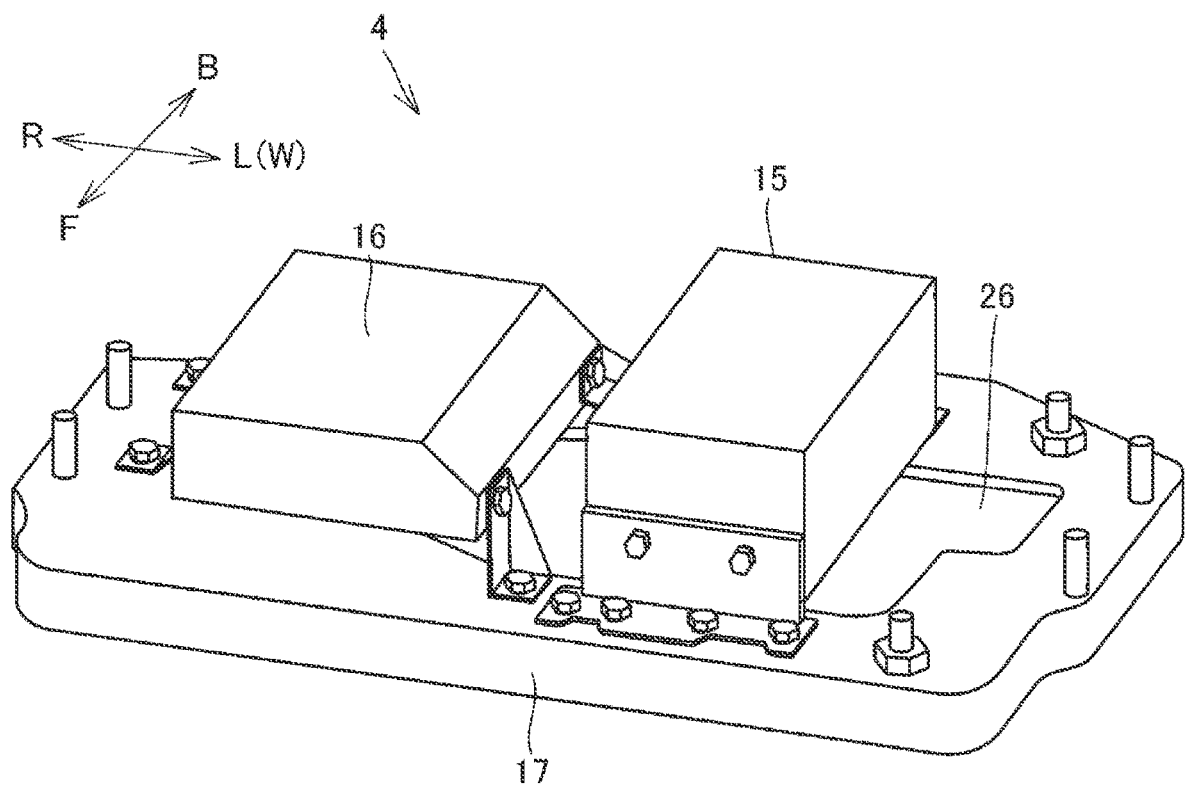
FIG. 3 is a perspective view illustrating the equipment unit.
Figure 4:
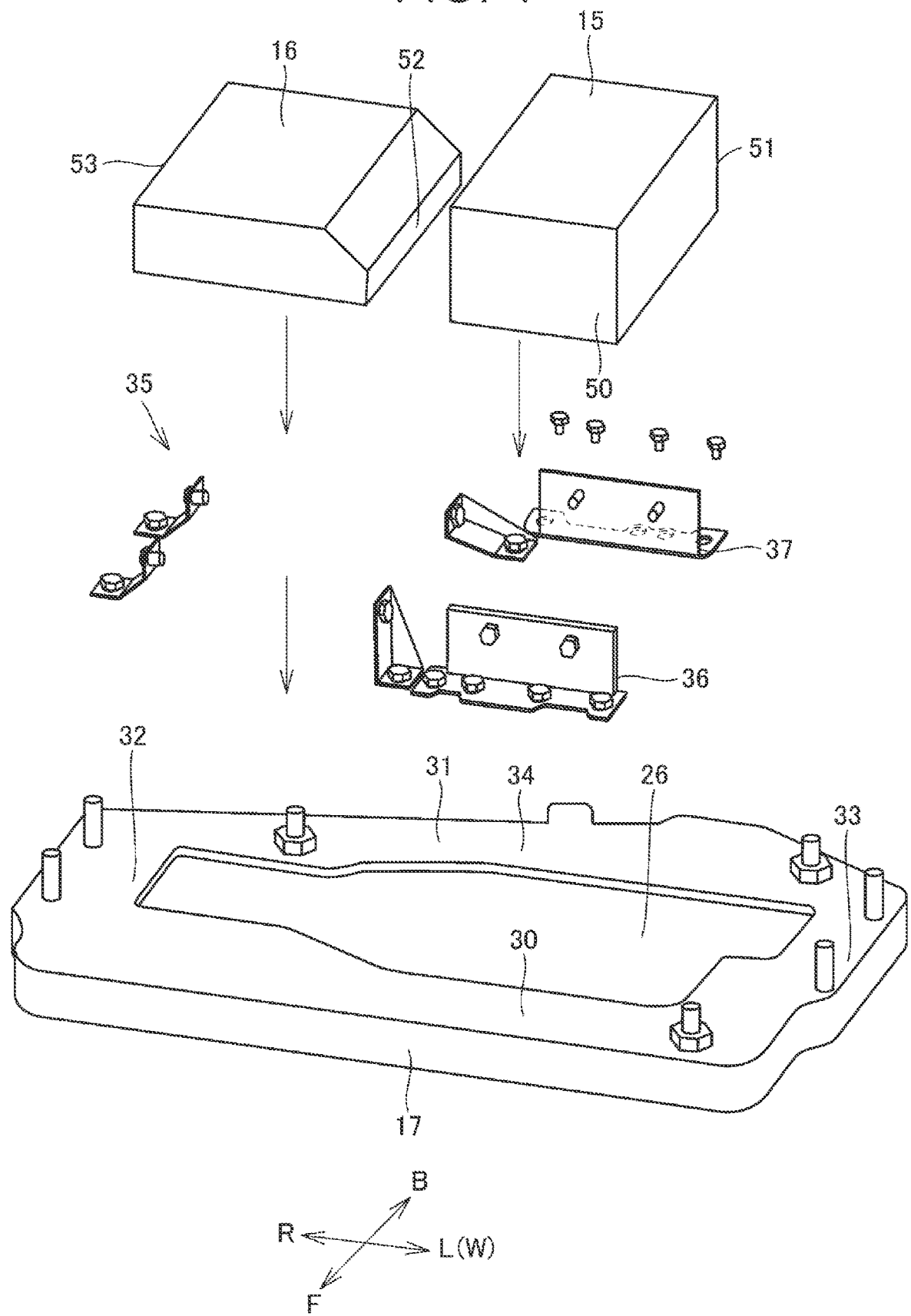
FIG. 4 is a disassembled perspective view illustrating the equipment unit.

FIG. 3 is a perspective view illustrating the equipment unit 4, and FIG. 4 is a disassembled perspective view illustrating the equipment unit 4. The compartment cross member 17 is provided elongated in the vehicle width direction (one direction) W of the vehicle 1. The compartment cross member 17 has an annular shape, and an opening portion 26 is provided in the compartment cross member 17.

The compartment cross member 17 includes cross portions 30 and 31, and side portions 32 and 33. The cross portions 30 and 31 are provided elongated in the vehicle width direction W of the vehicle 1, and the cross portion 30 is disposed forward from the cross portion 31 with a spacing therebetween.

The side portion 32 connects one end of the cross portion 30 and one end of the cross portion 31, and the side portion 33 connects the other end of the cross portion 30 and the other end of the cross portion 31. Note that the attachment member 24 illustrated in FIG. 2 is provided to the side portion 32, and the attachment member 25 is provided to the side portion 33.

An upper face 34 of the compartment cross member 17 is formed as a flat face, and the PCU (first equipment) 15 and the charger (second equipment) 16 are disposed on the upper face 34, with a spacing therebetween in the vehicle width direction W. Note that the PCU 15 includes an accommodation case made of aluminum or the like, and an inverter and a converter accommodated within this accommodation case. In the same way, the charger 16 includes an accommodation case made of aluminum or the like, and a converter or the like accommodated within this accommodation case.

Attachment members 35, 36, and 37, are provided to the compartment cross member 17. The charger (second equipment) 16 is fixed to the upper face 34 by the attachment member (second attachment member) 35 and a plurality of bolts. The PCU (first equipment) 15 is fixed to the upper face 34 by the attachment members (first attachment member) 36 and 37 and a plurality of bolts. The attachment member 36 is provided on a front face 50 of the PCU 15, and the attachment member 37 is provided to a back face 51 of the PCU 15.

Figure 5:
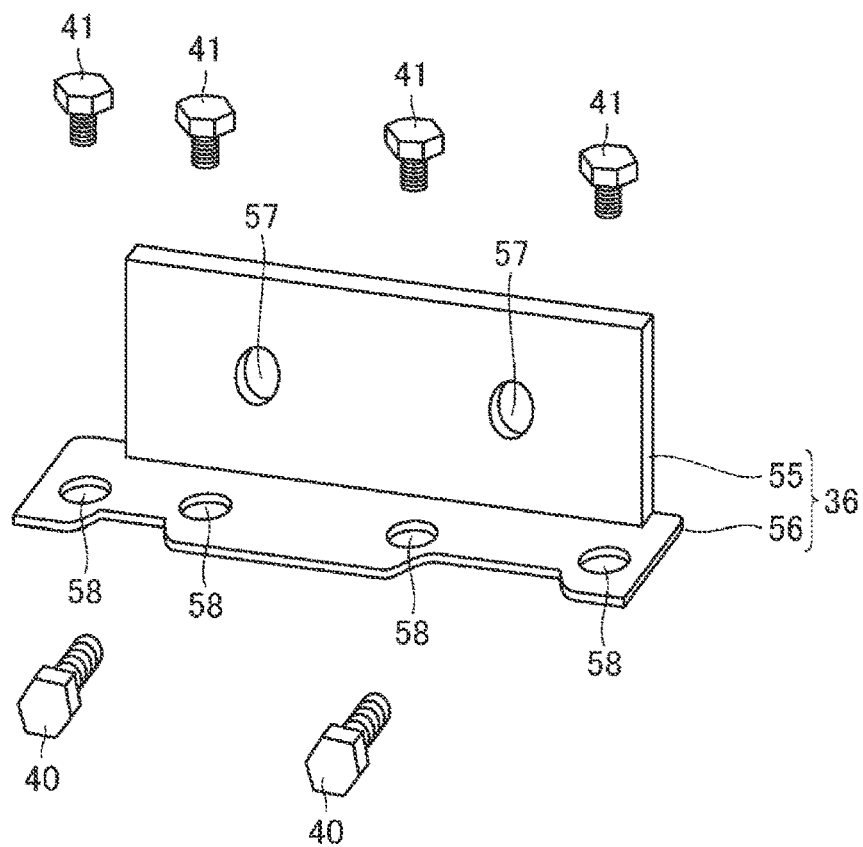
FIG. 5 is a perspective view illustrating an attachment member and bolts.

FIG. 5 is a perspective view illustrating the attachment member 36 and bolts 40 and 41. The attachment member 36 includes an upright wall 55 and a bottom plate 56. The upright wall 55 is provided extending upward from the upper face of the bottom plate 56. A plurality of through holes 57 is provided in the upright wall 55, with the bolts 40 being inserted through the through holes 57. The attachment member 36 is fixed to the PCU 15 by the bolts 40.

A plurality of through holes 58 is provided in the bottom plate 56, with the bolts 41 being inserted through the through holes 58. Thus, the attachment member 36 is fixed to the compartment cross member 17.

Figure 6:
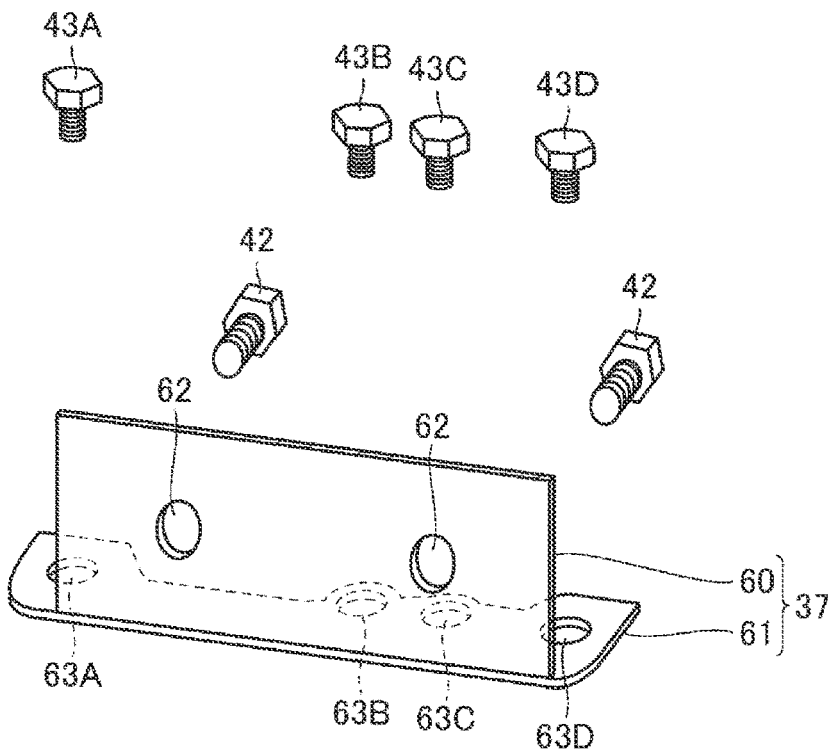
FIG. 6 is a perspective view illustrating an attachment member and a plurality of bolts.

FIG. 6 is a perspective view illustrating the attachment member 37 and a plurality of bolts 42 and 43A through 43D. The attachment member 37 includes an upright wall 60 and a bottom plate 61. The upright wall 60 is provided extending upward from the upper face of the bottom plate 61. A plurality of through holes 62 is provided in the upright wall 60, with the bolts 42 being inserted through the through holes 62. The attachment member 37 is thus fixed to the back face 51 of the PCU 15. A plurality of through holes 63A through 63D is provided in the bottom plate 61, with the bolts 43A through 43D being inserted through the through holes 63A through 63D. Thus, the attachment member 37 is fixed to the compartment cross member 17.

Figure 7:
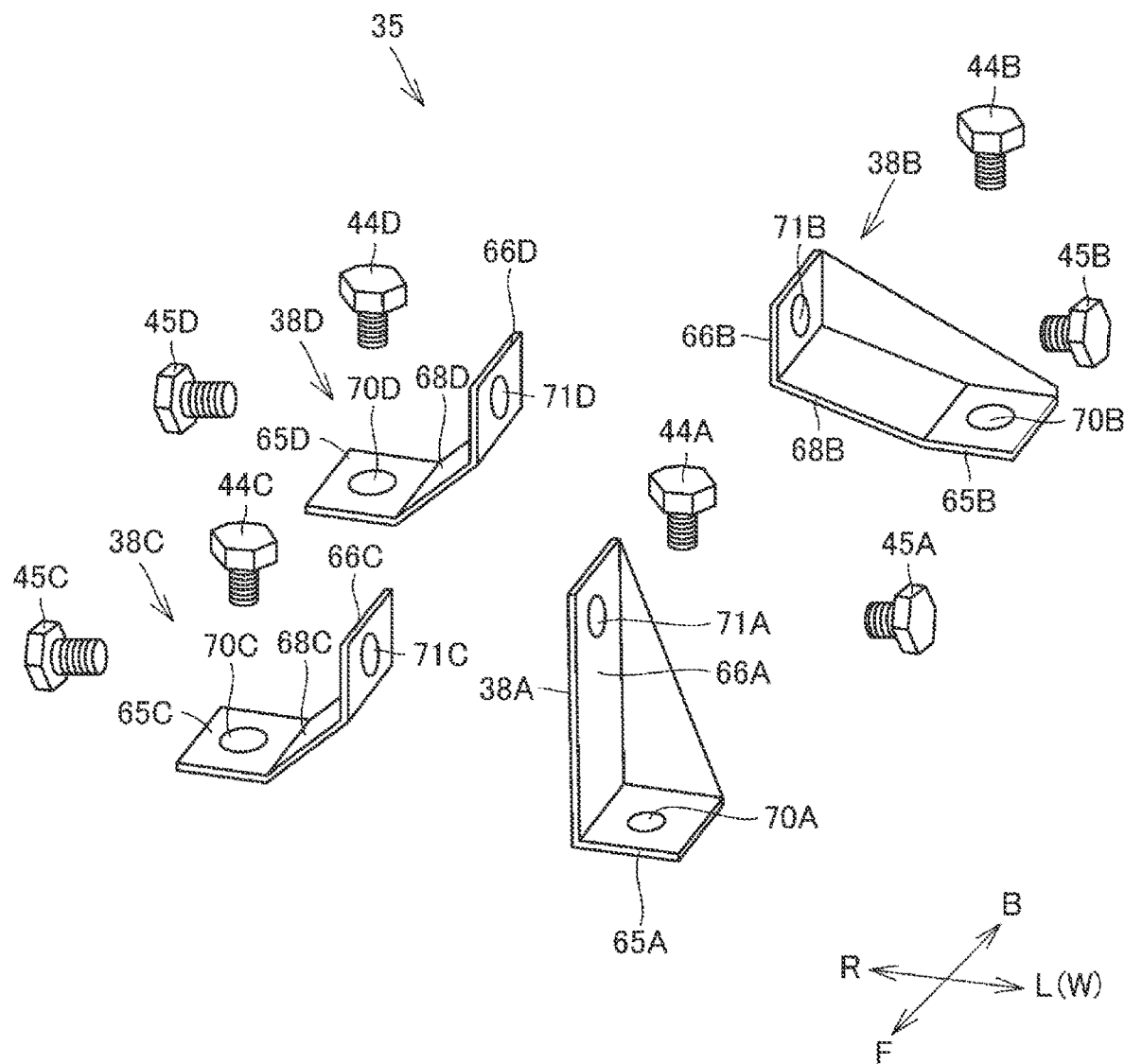
FIG. 7 is a perspective view illustrating an attachment member.

FIG. 7 is a perspective view illustrating the attachment member 35. The attachment member 35 includes attachment brackets 38A through 38D, and a plurality of bolts 44A through 44D and 45A through 45D.

The attachment bracket 38A links a left side face 52 of the charger 16 and the cross portion 30 of the compartment cross member 17. The attachment bracket 38B links the left side face 52 and the cross portion 31. In the same way, the attachment brackets 38C and 38D link a right side face 53 of the charger 16 and the side portion 32.

The attachment bracket 38A includes a mount plate 65A and an upright wall 66A. The upright wall 66A is provided extending upward from the mount plate 65A. A through hole 70A is provided in the mount plate 65A, and the mount plate 65A is fixed to the cross portion 30 by the bolt 44A inserted into the through hole 70A. A through hole 71A is provided in the upright wall 66A, and the upright wall 66A is fixed to the left side face 52 by the bolt 45A inserted into the through hole 71A.

The attachment bracket 38B includes a mount plate 65B, an upright wall 66B, and a linking piece 68B. A through hole 70B is provided in the mount plate 65B, and the mount plate 65B is fixed to the cross portion 31 by the bolt 44B inserted into the through hole 70B. A through hole 71B is provided in the upright wall 66B, and the upright wall 66B is fixed to the left side face 52 of the charger 16 by the bolt 45B inserted into the through hole 71B. Note that the linking piece 68B links the mount plate 65B and the upright wall 66B.

The attachment bracket 38C includes a mount plate 65C, an upright wall 66C, and a linking piece 68C. The attachment bracket 38D includes a mount plate 65D, an upright wall 66D, and a linking piece 68D.

Through holes 70C and 70D are provided in the respective mount plates 65C and 65D, and the mount plates 65C and 65D are fixed to the side portion 32 by the bolts 44C and 44D inserted into the respective through holes 70C and 70D.

Through holes 71C and 71D are provided in the respective upright walls 66C and 66D, and the upright walls 66C and 66D are fixed to the right side face 53 of the charger 16 by the bolts 45C and 45D inserted into the respective through holes 71C and 71D. Note that the linking piece 68C links the mount plate 65C and the upright wall 66C, and the linking piece 68D links the mount plate 65D and the upright wall 66D.

Figure 8:
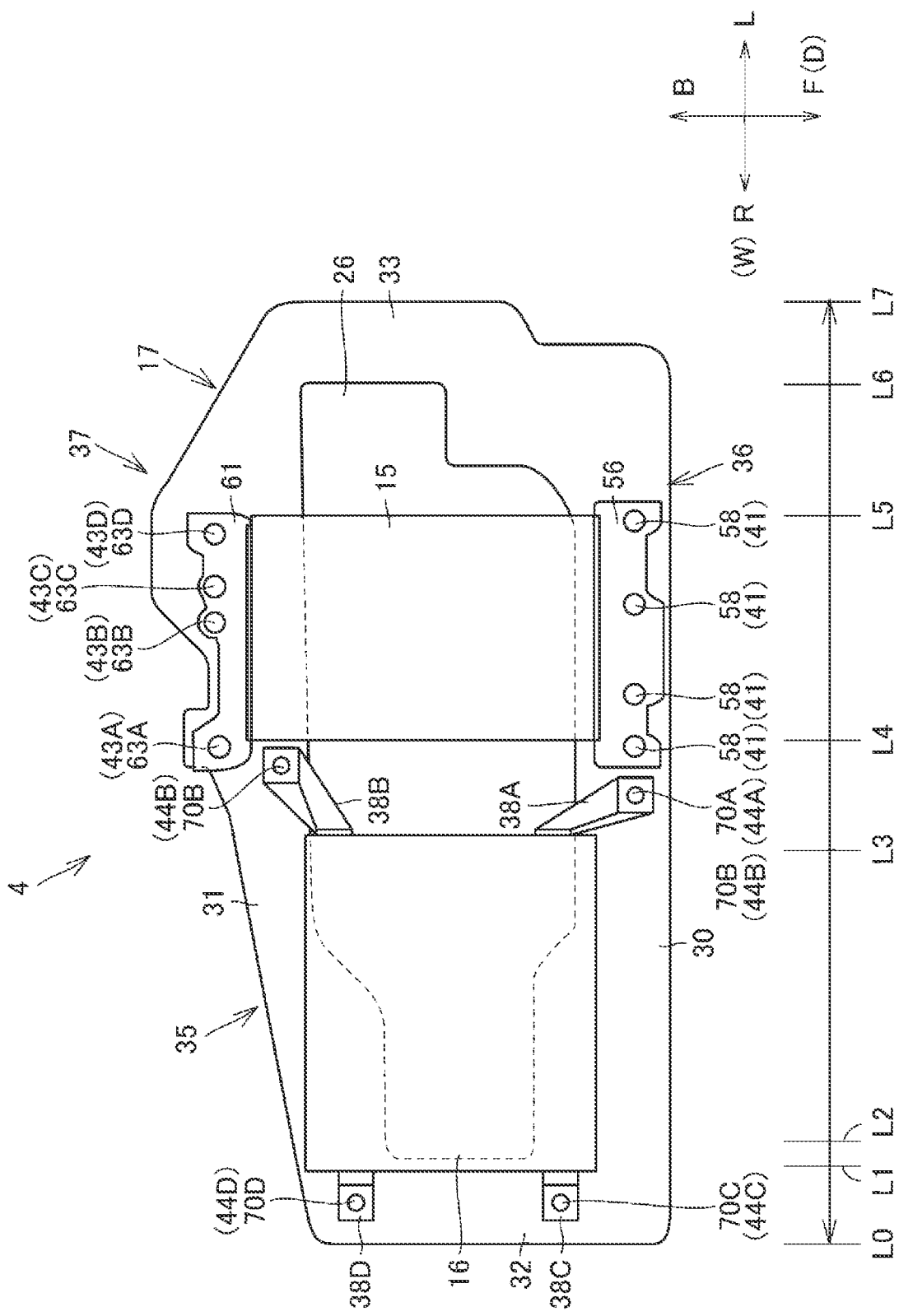
FIG. 8 is a plan view illustrating the equipment unit.

FIG. 8 is a plan view illustrating the equipment unit 4. The through hole 70A of the attachment bracket 38A and the bolt 44A are situated on the cross portion 30, and the attachment bracket 38A is placed so as to be adjacent to the bottom plate 56 of the attachment member 36.

Of the through holes 63A through 63D, provided in the bottom plate 61, the through hole 63A is provided at the closest position to the attachment bracket 38B.

Figure 9:
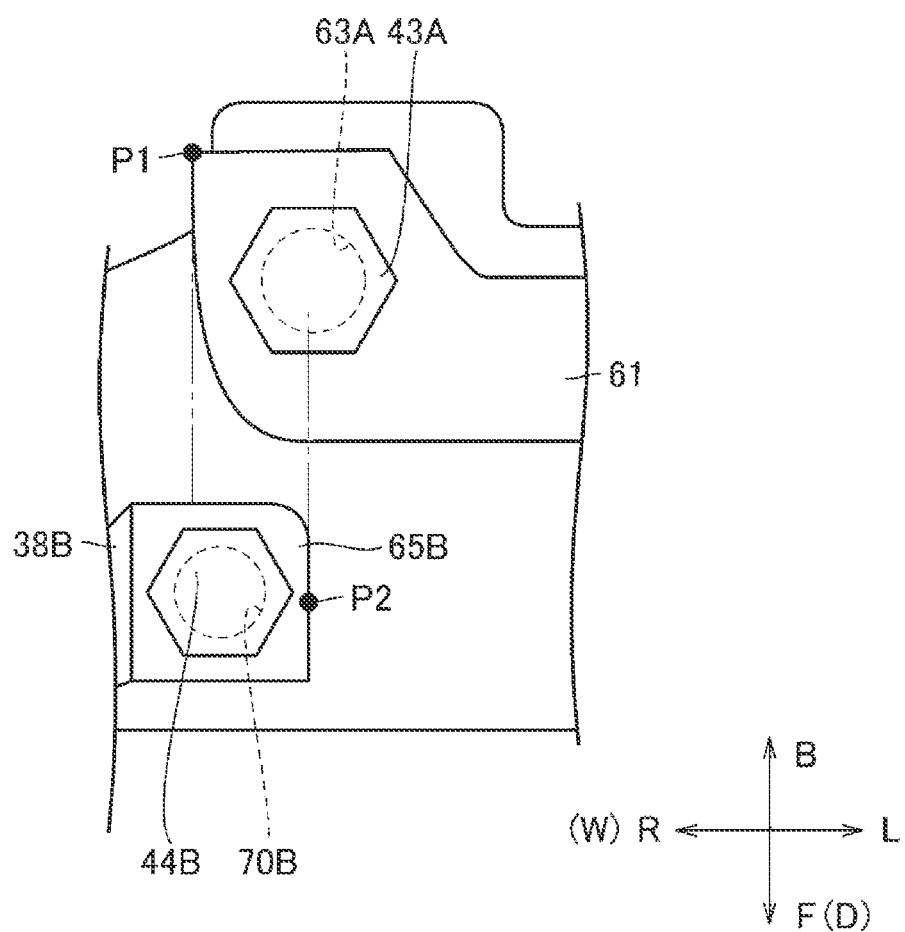
FIG. 9 is a plan view illustrating through holes and bolts, and a configuration of the surroundings thereof.

FIG. 9 is a plan view illustrating the through holes 70B and 63A and the bolts 44B and 43A, and a configuration of the surroundings thereof.

In FIG. 9, an "end portion P1" is a portion of the bottom plate 61 that is situated farthest to the right direction R side, and an "end portion P2" is a portion of the attachment bracket 38B situated farthest to the left direction L side. Note that the end portion P2 is situated at the end portion of the mount plate 65B of the attachment bracket 38B.

In the equipment unit 4 according to the first embodiment, part of the bottom plate 61 and part of the attachment bracket 38B overlap as viewed in a front-back direction D. Specifically, the end portion P1 of the bottom plate 61 is situated further toward the right direction R side as compared with the end portion P2 of the attachment bracket 38B, and the end portion P2 is situated further toward the left direction L side as compared with the end portion P1.

In the vehicle 1 configured as described above, the equipment unit 4 vibrates when the vehicle 1 travels or the like.

Next, an equipment unit 4A according to a comparative example will be described, and vibration profiles of the equipment unit 4 and the equipment unit 4A will be described.

Figure 10:
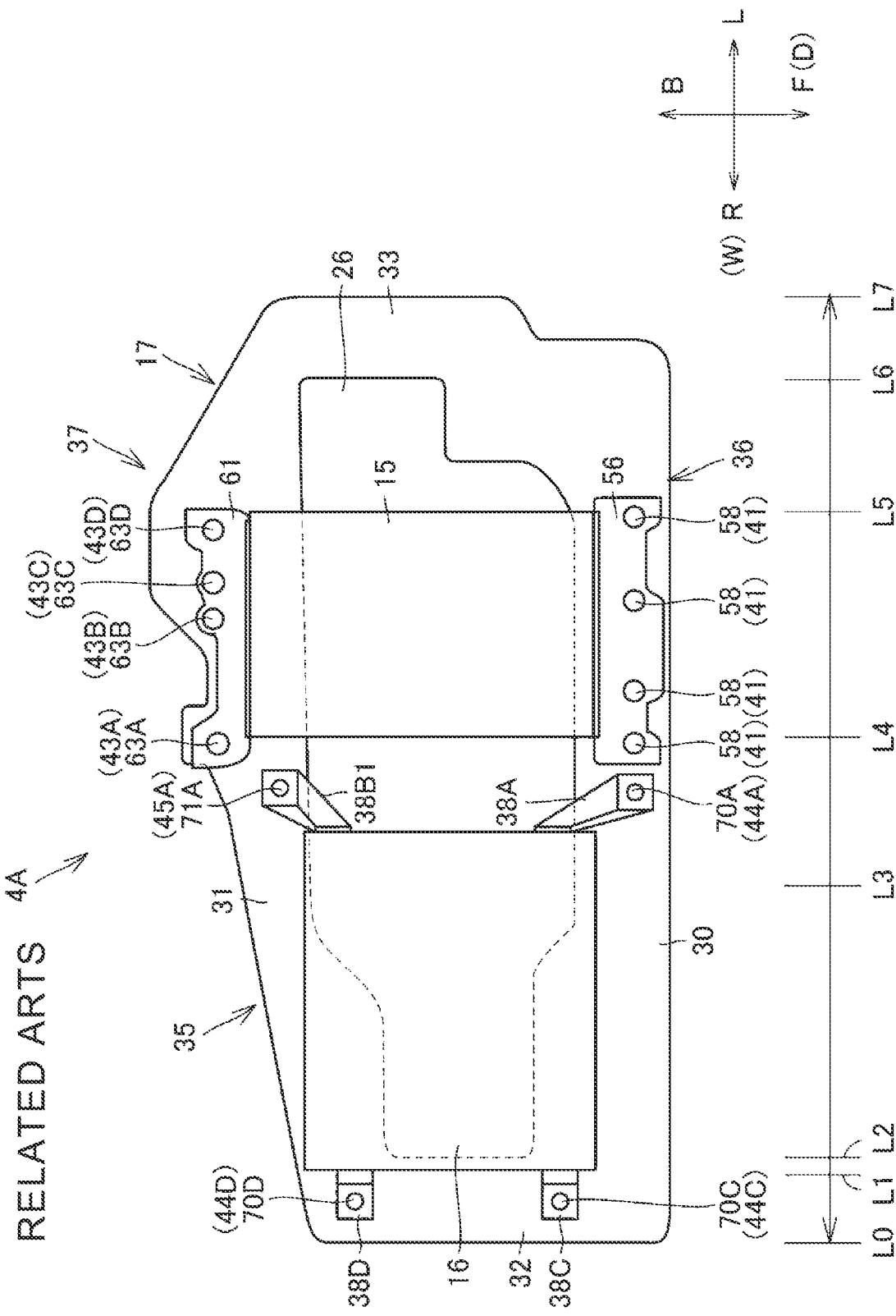
FIG. 10 is a plan view illustrating of a comparative equipment unit.

FIG. 10 is a plan view illustrating the equipment unit 4A. The equipment unit 4A has substantially the same configuration as that of the equipment unit 4, except for the configuration of an attachment bracket 38B 1. The attachment bracket 38B1 of the equipment unit 4A is disposed with a spacing in the vehicle width direction W as to the bottom plate 61, unlike the attachment bracket 38B of the equipment unit 4.

Figure 11:
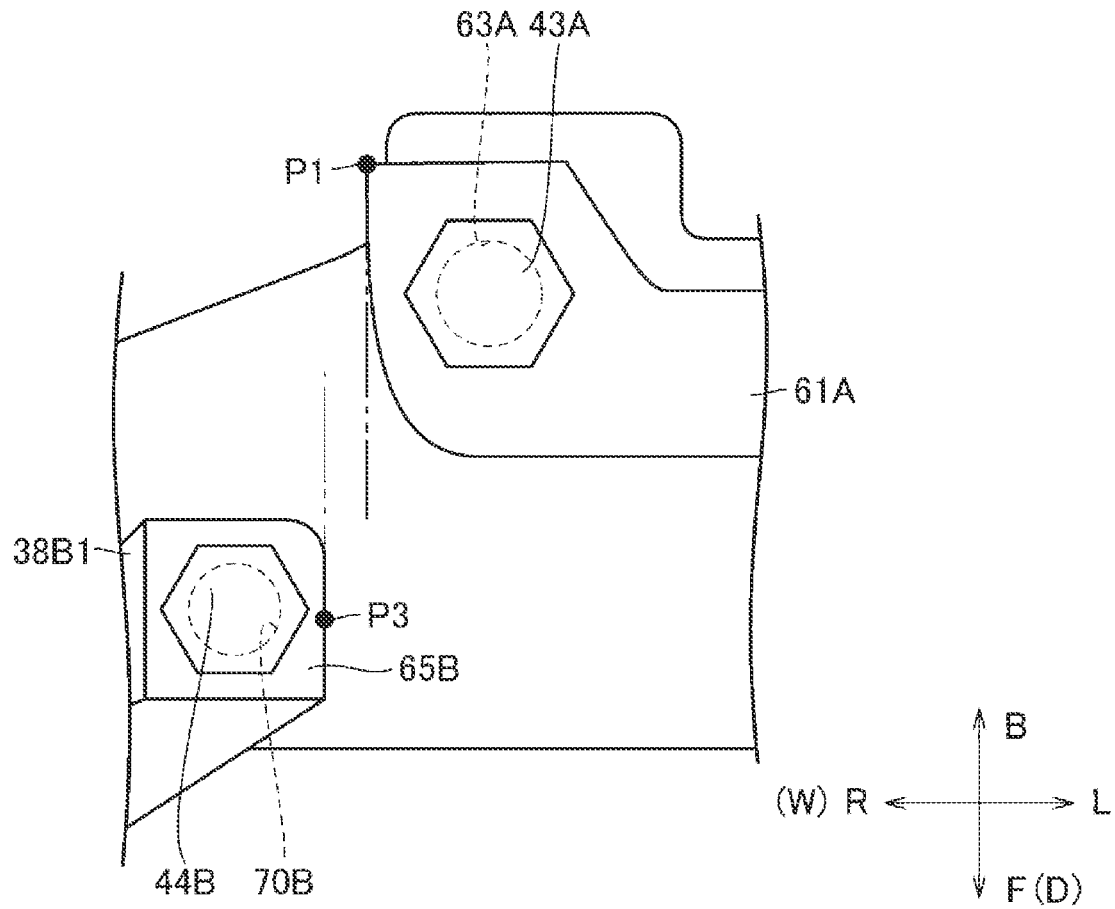
FIG. 11 is a plan view illustrating of a comparative attachment bracket and a bottom plate.

FIG. 11 is a plan view illustrating the attachment bracket 38B1 and a bottom plate 61A. In FIG. 11, an "end portion P3" is the left-side end portion of the attachment bracket 38B1. Specifically, the end portion P3 is situated at the left-side end portion of the mount plate 65B of the attachment bracket 38B1.

The end portion P3 and the end portion P1 are disposed with a spacing therebetween in the vehicle width direction W. In the equipment unit 4A, the mount plate 65B of the attachment bracket 38B1 and the bottom plate 61A do not overlap as viewed in the front-back direction D.

Figure 12:
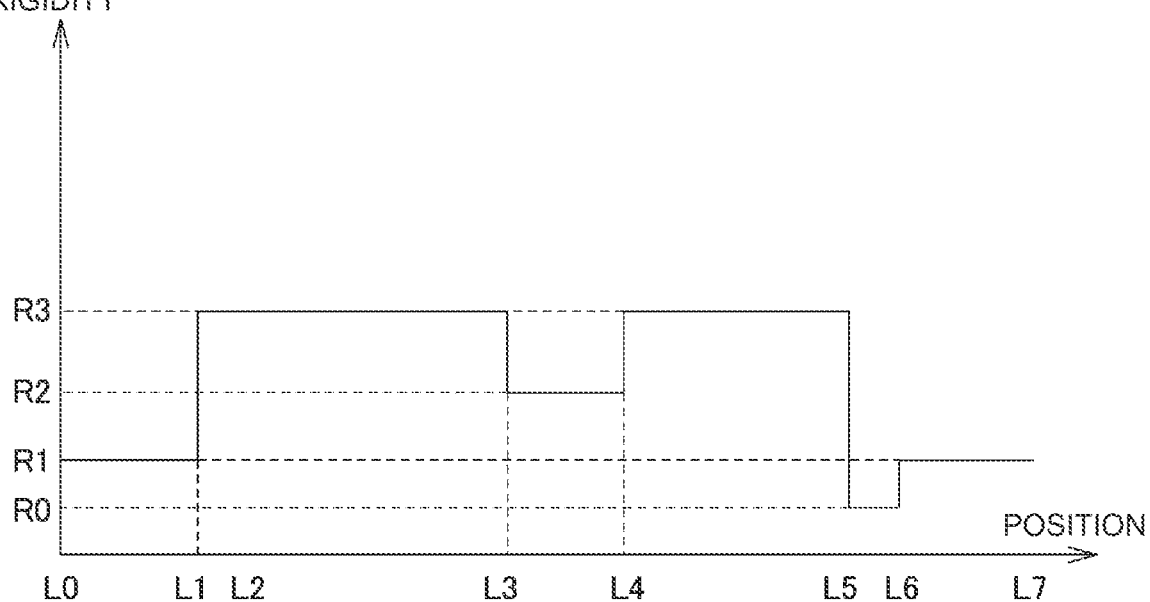
FIG. 12 is a graph schematically showing rigidity of the equipment unit.
Figure 13:
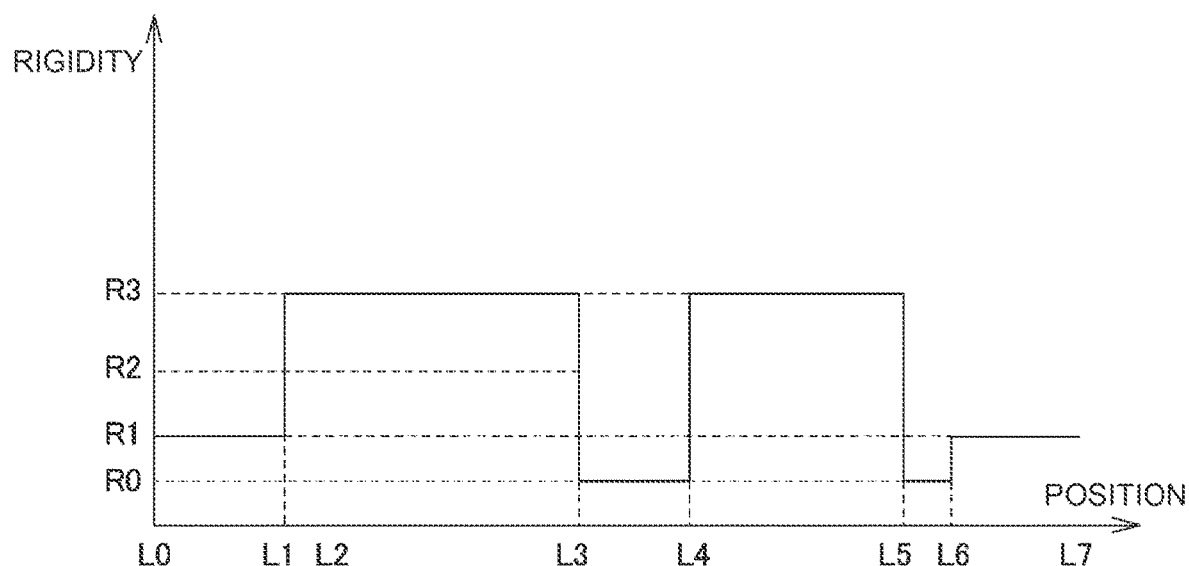
FIG. 13 is a graph schematically showing the rigidity of the comparative equipment unit of FIG. 10.
Figure 14:
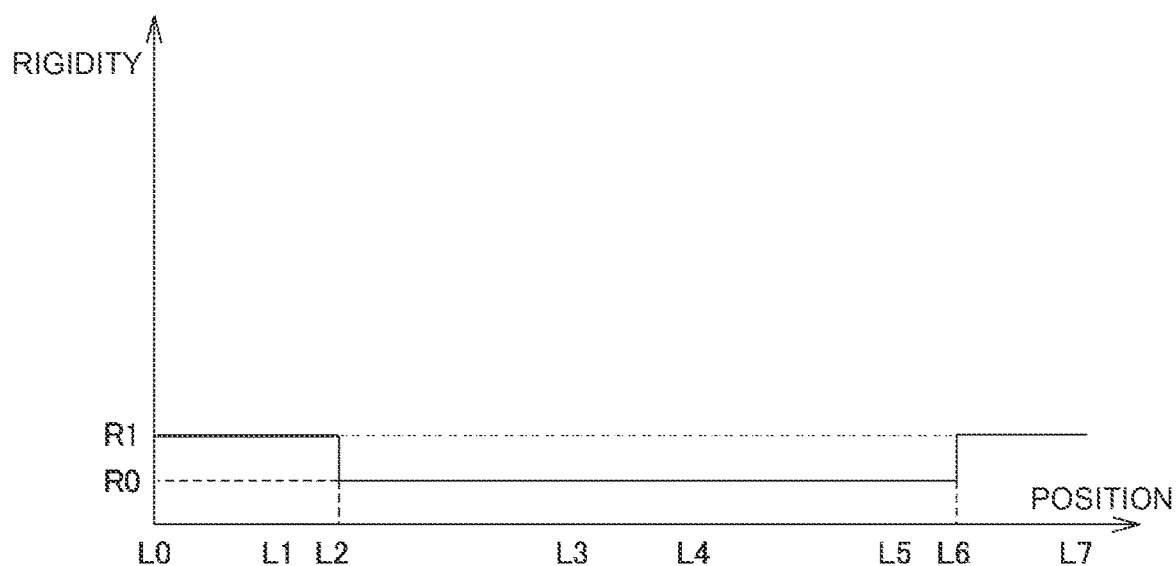
FIG. 14 is a graph showing rigidity of a compartment cross member.

FIG. 12 is a graph schematically showing rigidity of the equipment unit 4, and FIG. 13 is a graph schematically showing rigidity of the equipment unit 4A. FIG. 14 is a graph showing rigidity of the compartment cross member 17. Note that "rigidity" here refers to flexural rigidity.

The horizontal axis in each of the graphs represents the position in the vehicle width direction W. Specifically, the positions L0 through L7 in FIGS. 12 through 14 correspond to the positions L0 through L7 in FIGS. 8 and 10.

The position L0 is the position at the right-side end portion of the equipment units 4 and 4A. The position L1 is the position at the right-side end portion of the charger 16. The position L2 is the position at the right-side end portion of the opening portion 26. The position L3 is the position at the left-side end portion of the charger 16. The position L4 is the position at the right-side end portion of the PCU 15. The position L5 is the position at the left-side end portion of the PCU 15. The position L6 is the position at the left-side end portion of the opening portion 26. The position L7 is the position at the left-side end portion of the equipment units 4 and 4A.

First, the graph in FIG. 14 shows the rigidity of the compartment cross member 17. The side portion 32 is situated between the position L0 and the position L2, and the rigidity from the position L0 to the position L2 is rigidity R1.

The cross portion 30 and the cross portion 31 are situated between the position L2 and the position L6, and the rigidity from the position L2 to the position L6 is rigidity R0.

The side portion 33 is situated between the position L6 and the position L7, and the rigidity from the position L6 to the position L7 is rigidity R1.

It can be seen here that the rigidity of the side portions 32 and 33 is higher than the rigidity of the cross portion 30 and the rigidity of the cross portion 31.

With reference to FIGS. 12 and 13, and FIGS. 8 and 10, only the side portion 32 exists between position L0 and position L1 in the equipment units 4 and 4A, and the rigidity from the position L0 to the position L1 is rigidity R1.

In the equipment units 4 and 4A, the side portion 32, the attachment brackets 38C and 38D, and the charger 16 are situated between the position L1 and the position L2, and the rigidity from the position L1 to the position L2 is rigidity R3. Thus, the charger 16 and the attachment brackets 38C and 38D are situated between the position L1 and the position L2 in the equipment unit 4, and accordingly, rigidity is high as compared to the compartment cross member 17.

In the equipment units 4 and 4A, the cross portions 30 and 31 and the charger 16 are situated between the position L2 and the position L3. The rigidity from the position L2 to the position L3 is rigidity R3.

In the equipment units 4 and 4A, the portion between the position L3 and the position L4 is situated between the charger 16 and the PCU 15.

In the equipment unit 4, part of the mount plate 65B of the attachment bracket 38B and part of the bottom plate 61 overlap as viewed in the front-back direction D, as illustrated in FIG. 9. On the other hand, the mount plate 65B and the bottom plate 61A are disposed in the equipment unit 4A with a spacing therebetween in the vehicle width direction W, and the mount plate 65B and the bottom plate 61A do not overlap as viewed in the front-back direction D, as illustrated in FIG. 11.

Accordingly, the rigidity of the equipment unit 4 is higher than the rigidity of the equipment unit 4A from the position L3 to the position L4. Specifically, the rigidity of the equipment unit 4 is rigidity R2 from the position L3 to the position L4, and the rigidity of the equipment unit 4A is rigidity R0 (<rigidity R2), as can be seen from FIGS. 12 and 13.

The PCU 15, the attachment member 36, and the attachment member 37 are situated between the position L4 and the position L5 in the equipment units 4 and 4A.

Accordingly, the rigidity from the position L4 to the position L5 is high, and the rigidity is rigidity R3 for both the equipment unit 4 and the equipment unit 4A.

The cross portion 30 and the cross portion 31 are situated between the position L5 and the position L6 in the equipment units 4 and 4A, but the PCU 15 is not situated thereat. Accordingly, the rigidity from the position L5 to the position L6 is rigidity R0 for both of the equipment units 4 and 4A, in the same way as with the compartment cross member 17 alone.

The side portion 33 is situated between the position L6 and the position L7 in the equipment units 4 and 4A, in the same way as with the compartment cross member 17. Accordingly, the rigidity from the position L6 to the position L7 is rigidity R1 for the equipment units 4 and 4A.

In this way, the rigidity of the equipment unit 4 is higher than the rigidity of the equipment unit 4A from the position L3 to the position L4.

Figure 15:
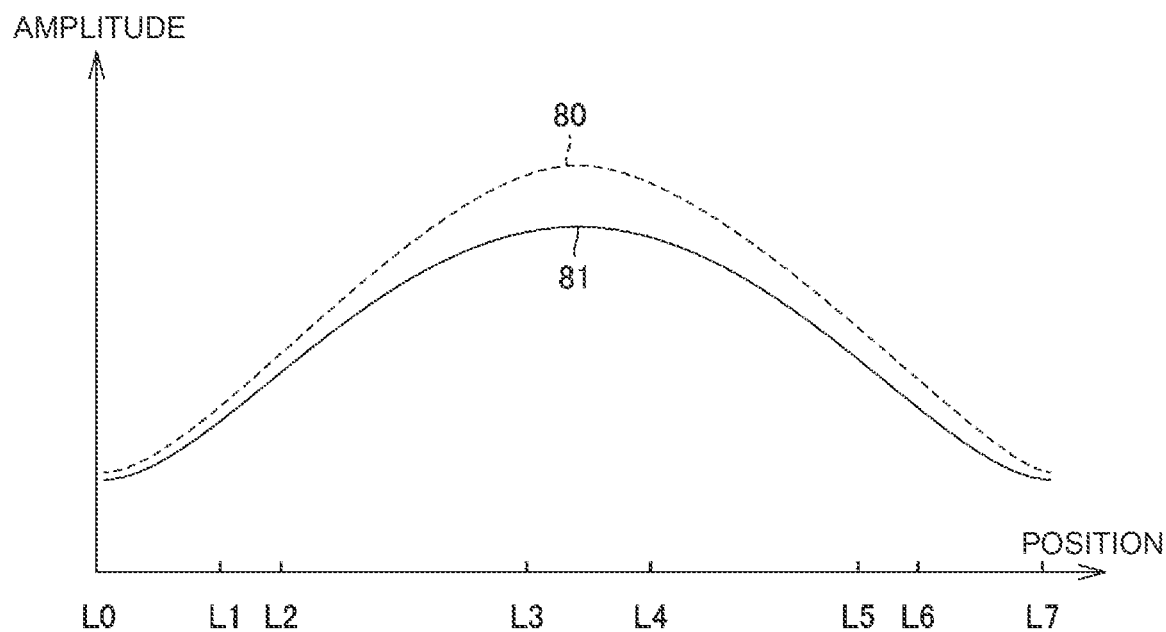
FIG. 15 is a graph illustrating vibration profiles of the equipment unit and the equipment unit.

FIG. 15 is a graph showing vibration profiles of the equipment unit 4 and the equipment unit 4A. Specifically, FIG. 15 is a graph that shows vibrations occurring at the equipment unit 4 when the vehicle 1 in which the equipment unit 4 is installed travels, and vibrations occurring at the equipment unit 4A when the vehicle 1 in which the equipment unit 4A is installed travels, under the same traveling conditions.

The horizontal axis of the graph represents the positions in the equipment units 4 and 4A. The vertical axis of the graph represents the amplitude of the equipment units 4 and 4A. Note that a curve 80 represents the vibration profile of the equipment unit 4A, and a curve 81 represents the vibration profile of the equipment unit 4.

The equipment units 4 and 4A are in a state of being supported at both ends, with both end portions fixed to the vehicle body 2. Accordingly, in the example illustrated in FIG. 15, the middle portions of the equipment units 4 and 4A correspond to anti-nodes, and the portions situated between the position L3 and the position L4 correspond to anti-nodes.

It can be seen from FIGS. 12 and 13 that the rigidity of the equipment unit 4 is higher than that of the equipment unit 4A from the position L3 to the position L4. Accordingly, the amplitude of the equipment unit 4 is smaller than that of the equipment unit 4A from the position L3 to the position L4 corresponding to the anti-nodes. Consequently, the amplitude of the equipment unit 4 is smaller than that of the equipment unit 4A over the entire length thereof.

Thus, in the first embodiment, part of the bottom plate 61 and part of the attachment bracket 38B are disposed overlapping as viewed in the front-back direction D, thereby raising rigidity from the position L3 to the position L4, and suppressing vibrations occurring at the equipment unit 4.

Second Embodiment

Figure 16:
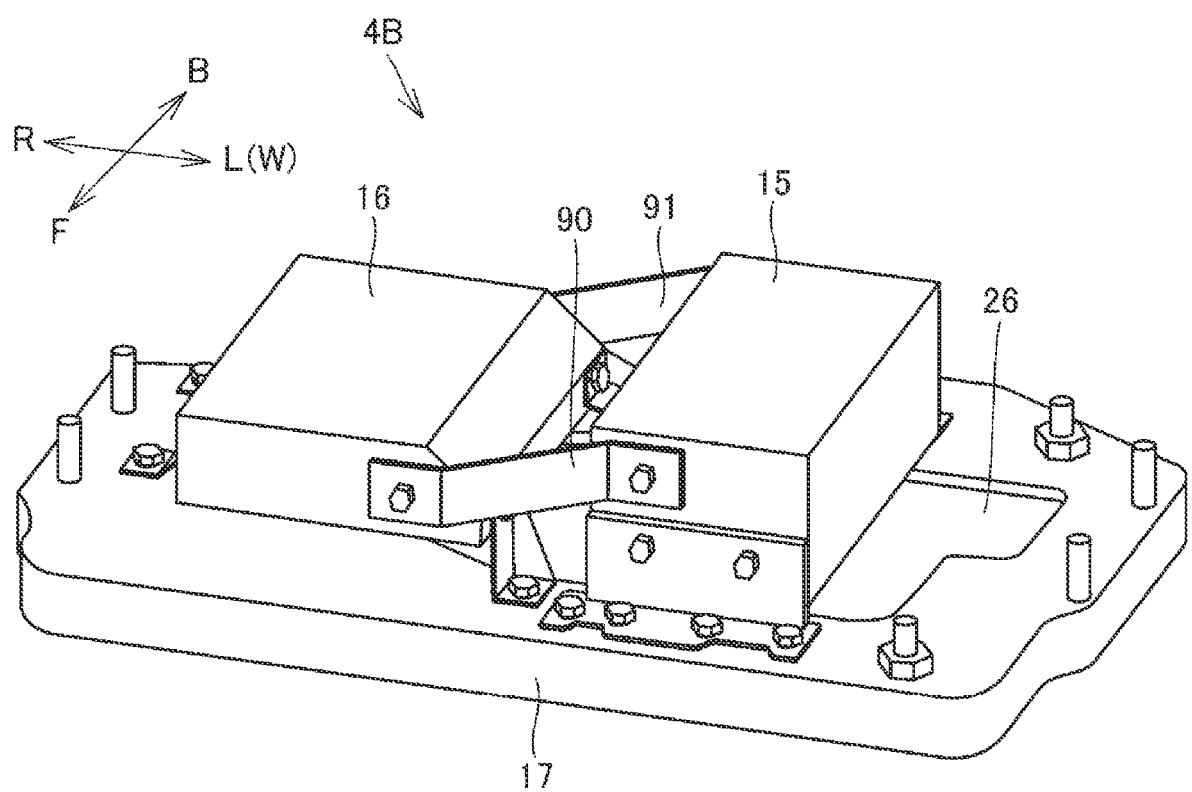
FIG. 16 is a perspective view illustrating an equipment unit.

An equipment unit 4B installed in a vehicle according to a second embodiment will be described with reference to FIGS. 16 and 17. FIG. 16 is a perspective view illustrating the equipment unit 4B, and FIG. 17 is a plan view illustrating the equipment unit 4B.

Figure 17:
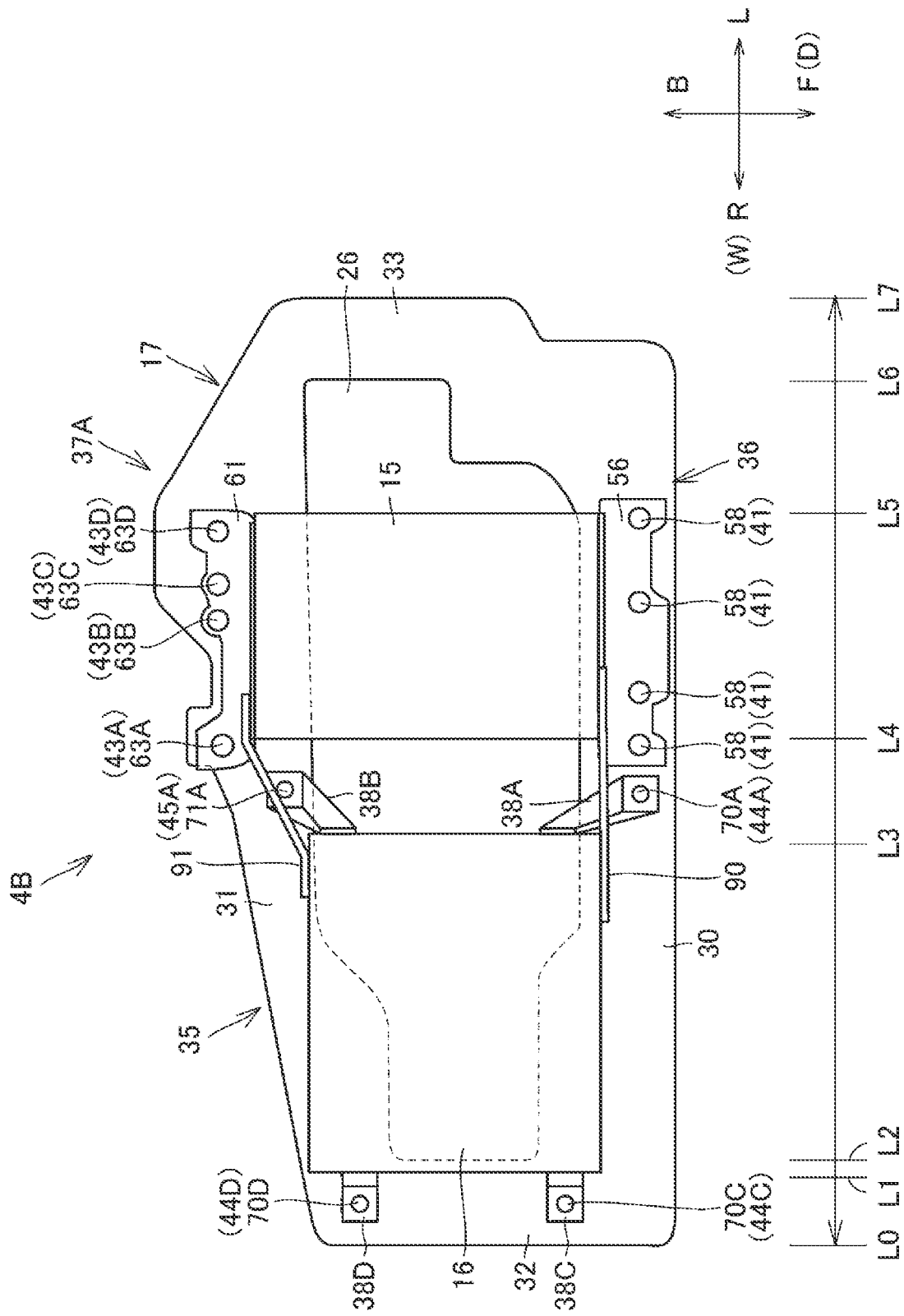
FIG. 17 is a plan view illustrating the equipment unit of FIG. 16.

With reference to FIGS. 16 and 17, the equipment unit 4B differs from the equipment unit 4 with regard to the point that the equipment unit 4B includes a linking member 90 and a linking member 91. Also, an attachment member 37A is provided to the equipment unit 4B instead of the attachment member 37 of the equipment unit 4.

The linking member 90 and the linking member 91 link the PCU 15 and the charger 16, and the linking member 90 and the linking member 91 are provided extending between the PCU 15 and the charger 16. Note that the linking members 90 and 91 are made of a metal material such as aluminum or the like, for example.

Accordingly, the linking member 90 and the linking member 91 are situated between the position L3 and the position L4.

In FIG. 17, the attachment member 37A fixes the PCU 15 to the cross portion 31. On the other hand, the attachment member 37A and the attachment bracket 38B are disposed with a spacing therebetween in the vehicle width direction W.

Accordingly, the bottom plate 61 and the attachment bracket 38B do not overlap as viewed in the front-back direction D in the equipment unit 4B.

In the equipment unit 4B configured as described above, the linking member 90 and the linking member 91 are disposed between the position L3 and the position L4, and accordingly, the rigidity at this portion can be suppressed from becoming low.

Thus, even when the equipment unit 4B vibrates due to the vehicle traveling or the like, occurrence of large vibrations can be suppressed at the portion situated between the position L3 and the position L4, which corresponds to the anti-node. Note that the linking members 90 and 91 are disposed on the upper side as compared to the middle of the PCU 15 and the charger 16 in the up-down direction. Disposing the linking member 90 and the linking member 91 in this way enables the second moment of area between the PCU 15 and the charger 16 to be increased, and the rigidity of the equipment unit 4B can be increased. Accordingly, the vibrations occurring at the equipment unit 4B can be kept low. Note that an arrangement may be made where part of the bottom plate 61 and part of the attachment bracket 38B overlap as viewed in the front-back direction D as in the first embodiment, and also the linking members 90 and 91 are provided.

Third Embodiment

Figure 18:
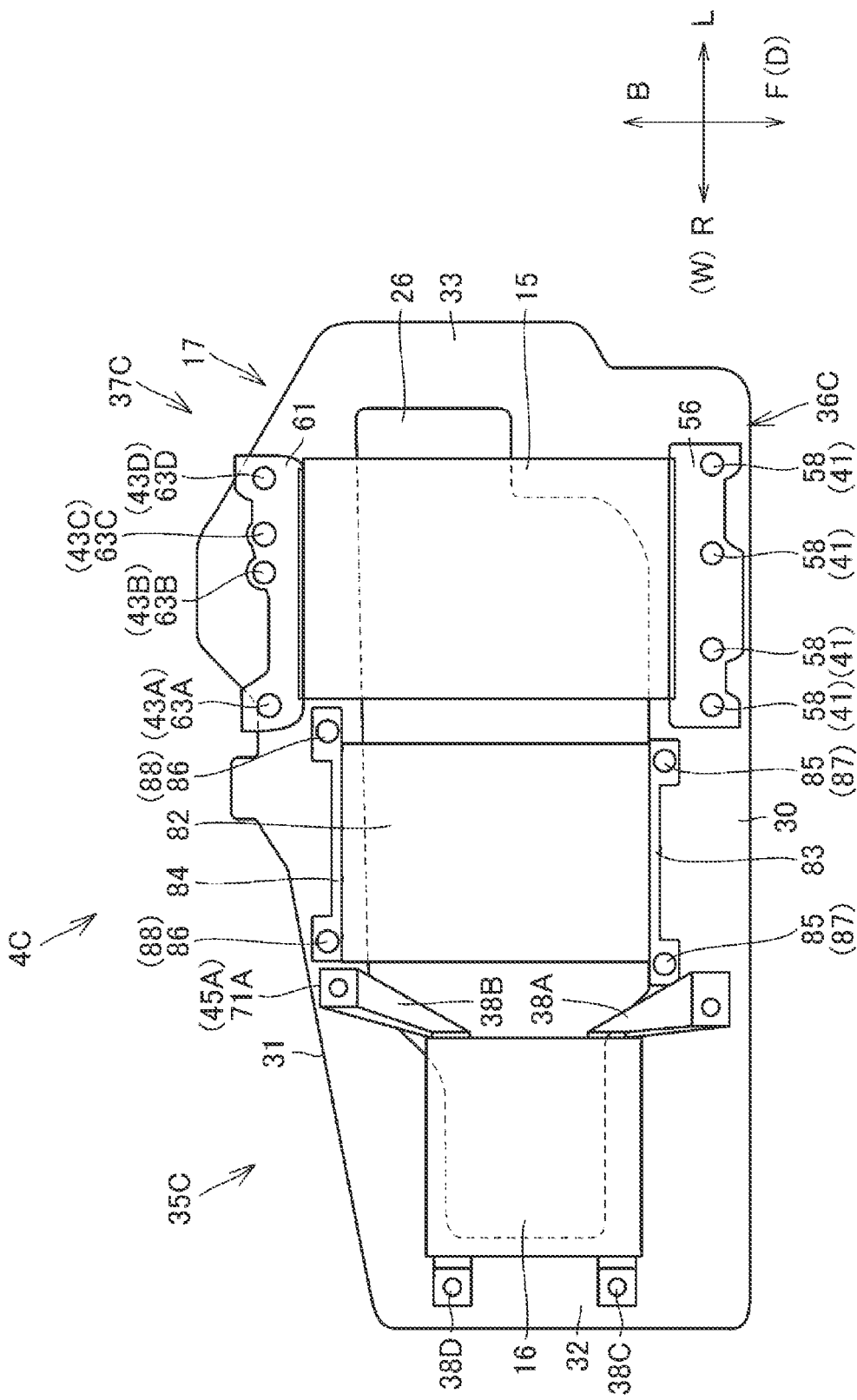
FIG. 18 is a plan view illustrating an equipment unit.

An equipment unit 4C installed in a vehicle according to a third embodiment will be described with reference to FIG. 18. FIG. 18 is a plan view illustrating the equipment unit 4C. The equipment unit 4C is provided with the PCU 15, the charger 16, attachment members 35C, 36C, and 37C, electric equipment 82, an attachment member 83, and an attachment member 84. Note that the attachment member 35C is an example of a second attachment member, and the attachment members 36C and 37C are an example of a first attachment member.

The electric equipment 82 is fixed to the upper face of the compartment cross member 17, and the electric equipment 82 is disposed between the PCU 15 and the charger 16. The electric equipment 82 is an example of third equipment.

The electric equipment 82 includes a metal case, and equipment accommodated within this metal case. Accordingly, the rigidity of the electric equipment 82 matches or is close to the rigidity of the PCU 15 and the charger 16.

The attachment members 83 and 84 are provided to the compartment cross member 17, and the electric equipment 82 is fixed to the cross portions 30 and 31 by the attachment members 83 and 84. The attachment members 83 and 84 are an example of a third attachment member.

A plurality of through holes 85 are provided in the attachment member 83, and bolts 87 are inserted through the through holes 85. Thus, the attachment member 83 is fixed to the cross portion 30. A plurality of through holes 86 are provided in the attachment member 84, and bolts 88 are inserted through the through holes 86. Thus, the attachment member 84 is fixed to the cross portion 31.

Part of the attachment member 83 and part of the attachment bracket 38A overlap as viewed in the front-back direction D. Part of the attachment member 84 and part of the bottom plate 61 overlap as viewed in the front-back direction D.

Accordingly, the rigidity of the equipment unit 4C is suppressed from being low between the charger 16 and the electric equipment 82. In the same way, the rigidity of the equipment unit 4C is suppressed from being low between the PCU 15 and the electric equipment 82. In other words, the rigidity of the portion between the charger 16 and the electric equipment 82 and the rigidity of the portion between the PCU 15 and the electric equipment 82 may be higher than the rigidity at portions situated at both end portions of the compartment cross member 17 in the equipment unit 4C.

Accordingly, even when the equipment unit 4C vibrates due to the vehicle in which the equipment unit 4C is installed traveling, the equipment unit 4C can be suppressed from largely vibrating.

Depending on the vibrations that the equipment unit 4C is subjected to, a plurality of anti-nodes may be formed in the equipment unit 4C. For example, anti-nodes may be formed between the charger 16 and the electric equipment 82, at the portion where the electric equipment 82 is situated, and between the electric equipment 82 and the PCU 15.

In this case, even when anti-nodes are formed in the equipment unit 4C, the rigidity between the charger 16 and the electric equipment 82, and the rigidity between the electric equipment 82 and the PCU 15 are secured. Further, the rigidity of the electric equipment 82 is high. Thus, the rigidity is suppressed from being low at each portion, and accordingly the amplitude at the anti-nodes can be kept low.

Note that a linking member connecting the electric equipment 82 and the charger 16 may be provided, thereby securing rigidity between the electric equipment 82 and the charger 16. In the same way, a linking member connecting the electric equipment 82 and the PCU 15 may be provided to secure rigidity between the electric equipment 82 and the PCU 15.

It should be understood that the embodiments disclosed herein are exemplary in all points and are not limiting. The scope of the disclosure is set forth in the claims, and all equivalencies and all modifications within the scope thereof are encompassed.

What is claimed is:

1. A vehicle comprising:
a vehicle body in which a mounting chamber is provided; and
an equipment unit disposed within the mounting chamber, wherein:
the equipment unit includes a compartment cross member extending in one direction, the compartment cross member of which a first end portion and a second end portion situated on respective ends in the one direction being fixed to the vehicle body, and a first equipment and a second equipment fixed to the compartment cross member and disposed with a spacing between each other; and
a rigidity of the equipment unit at a portion situated between the first equipment and the second equipment is higher than a rigidity of the equipment unit at a portion where the first end portion is situated.

2. The vehicle according to claim 1, further comprising:
a first attachment member configured to fix the first equipment to the compartment cross member; and
a second attachment member configured to fix the second equipment to the compartment cross member, wherein:
the one direction is a vehicle width direction; and
at least part of the first attachment member and at least part of the second attachment member overlap as viewed in a vehicle front-back direction, between the first equipment and the second equipment in the vehicle width direction.

3. The vehicle according to claim 1, further comprising linking members that link the first equipment and the second equipment.

4. The vehicle according to claim 1, wherein the rigidity of the equipment unit at the portion situated between the first equipment and the second equipment is higher than a rigidity of the equipment unit at a portion where the second end portion is situated.

5. The vehicle according to claim 1, wherein:
a third equipment fixed to the compartment cross member is disposed between the first equipment and the second equipment;
a rigidity of the equipment unit at a portion situated between the first equipment and the third equipment is higher than the rigidity of the equipment unit at the portion where the first end portion is situated; and
a rigidity of the equipment unit at a portion situated between the second equipment and the third equipment is higher than the rigidity of the equipment unit at the portion where the first end portion is situated.

6. The vehicle according to claim 5, further comprising:
a first attachment member configured to fix the first equipment to the compartment cross member;
a second attachment member configured to fix the second equipment to the compartment cross member; and
a third attachment member configured to fix the third equipment to the compartment cross member, wherein:
the one direction is a vehicle width direction;
at least part of the first attachment member and at least part of the third attachment member overlap as viewed in a vehicle front-back direction, between the first equipment and the third equipment in the vehicle width direction; and
at least part of the second attachment member and at least part of the third attachment member overlap as viewed in the vehicle front-back direction, between the second equipment and the third equipment in the vehicle width direction.

7. The vehicle according to claim 5, further comprising:
a linking member that links the first equipment and the third equipment; and
a linking member that links the second equipment and the third equipment.

8. The vehicle according to claim 5, wherein:
the rigidity of the equipment unit at the portion situated between the first equipment and the third equipment is higher than a rigidity of the equipment unit at a portion where the second end portion is situated; and
the rigidity of the equipment unit at the portion situated between the second equipment and the third equipment is higher than the rigidity of the equipment unit at the portion where the second end portion is situated.

* * * * *